United States Patent [19]

Saegusa et al.

[11] Patent Number: 4,792,603

[45] Date of Patent: * Dec. 20, 1988

[54] METHOD OF PRODUCING A POLYETHER PREPOLYMER

[75] Inventors: Takeo Saegusa, Kyoto; Jiro Horikawa, Ehime; Masahiro Niwano, Ehime; Takenobu Kanazawa, Ehime, all of Japan

[73] Assignee: Sumitomo Chemical Co., Ltd., Osaka, Japan

[*] Notice: The portion of the term of this patent subsequent to Mar. 17, 2004 has been disclaimed.

[21] Appl. No.: 914,515

[22] Filed: Oct. 2, 1986

Related U.S. Application Data

[62] Division of Ser. No. 673,636, Nov. 21, 1984, abandoned.

[30] Foreign Application Priority Data

Nov. 22, 1983 [JP] Japan ................... 58-220185
Feb. 27, 1984 [JP] Japan ................... 59-037151

[51] Int. Cl.$^4$ ................ C07D 207/00; C07D 211/36; C08G 69/14
[52] U.S. Cl. .................... 540/451; 525/408; 528/312; 528/326; 528/425; 540/525; 546/188; 546/189; 548/519; 548/543; 548/550; 548/551
[58] Field of Search ............ 525/408; 528/323; 540/451, 525, 188; 546/243; 548/519, 543, 550, 551

[56] References Cited

U.S. PATENT DOCUMENTS

| 4,031,164 | 6/1977 | Hedrick et al. | 260/857 PG |
|---|---|---|---|
| 4,442,234 | 4/1984 | Kosa | 525/420 |
| 4,487,920 | 12/1984 | Akikapeddi | 525/420 |
| 4,501,861 | 2/1985 | Woodbrey | 525/408 |
| 4,507,465 | 3/1985 | Chiba et al. | 525/420 |
| 4,590,243 | 5/1986 | Gabbert et al. | 525/184 |
| 4,650,608 | 3/1987 | Saegusa et al. | 528/323 |

FOREIGN PATENT DOCUMENTS

| 0067694 | 12/1982 | European Pat. Off. |
|---|---|---|
| 1067153 | 5/1967 | United Kingdom . |
| 1273822 | 5/1972 | United Kingdom . |
| 1292865 | 10/1972 | United Kingdom . |

OTHER PUBLICATIONS

Yamashita et al, "Block Copolymerization v. Block Anionic Polymerization of Lactams", Journal of Polymer Science, vol. 10, Part A-1, No. 9 (1972), pp. 3577-3587.

Primary Examiner—John C. Bleutge
Assistant Examiner—A. Carrillo
Attorney, Agent, or Firm—Sughrue, Mion, Zinn, Macpeak & Seas

[57] ABSTRACT

A method for producing a polyether-polyamide block copolymer is disclosed, comprising copolymerizing, in the presence of an anionic polymerization catalyst, a lactam and a polyether prepolymer presented by the formula:

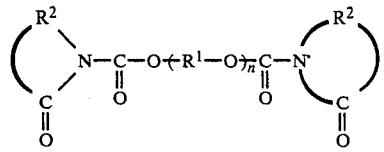

wherein $R^1$ is an aliphatic hydrocarbon residual group having 2 to 6 carbon atoms, $R^2$ is an aliphatic hydrocarbon residual group having 3 to 12 carbon atoms, and n is an integer of 4 to 450. The polyester prepolymer is prepared by reacting a polyoxyalkylene having two terminal hydroxy groups with an N-chlorocarbonyl lactam. The polyether-polyamide block according to the invention has high impact strength and is substantially colorless.

3 Claims, No Drawings

METHOD OF PRODUCING A POLYETHER PREPOLYMER

This is a division of application Ser. No. 673,636, filed Nov. 21, 1984, now abandoned.

FIELD OF THE INVENTION

The present invention relates to a method of producing a polyether-polyamide block copolymer of high impact resistance, and more particularly to a method of producing an impact-resistant polyether-polyamide block copolymer by anionic polymerization of caprolactam in the presence of a prepolymer comprising a polyoxyalkylene as a main ingredient.

BACKGROUND OF THE INVENTION

Methods of producing a polyether-polyamide block copolymer containing a polyoxyalkylene polymer moiety and a polylactam polymer moiety by means of anionic polymerization in the presence of an anionic polymerization catalyst are described in, for example, Japanese patent publication No. 40,120/79 and U.S. Pat. Nos. 3,862,262, 4,031,164, 4,034,015 and 4,223,112; these patents indicate that said block copolymer can be used for textile fibers, foams, furnitures and automotive parts because of its excellent properties. However, one of the main disadvantages of the polyether-polyamide block copolymer obtained by the method of the patents shown above is that the copolymer is colored yellow, and because of this defect, colorless products cannot be obtained, and even when it is desirable to give certain colors to products, only dull colors are obtained.

German patent application (OLS) No. 1,909,577 describes that anionic polymerization of a lactam can be effected using as an activator an ester of a lactam-N-carboxylic acid and a di- or polyol compound represented by the formula:

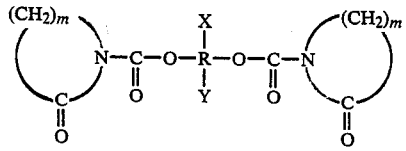

wherein R is an aliphatic group having 2 to 12 carbon atoms, and m is an integer of 4 to 12, and X and Y are each a hydrogen atom or a residual group of

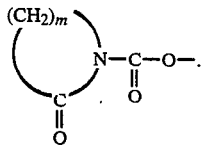

However, the object of said patent is to produce a polyamide by homopolymerization of a lactam, but not to produce a block copolymer of a polyoxyalkylene and a polyamide, as in the case of the present invention.

In order to overcome the defects of the prior art methods, the inventors have conducted intensive research on a method of obtaining a colorless polyether-polyamide block copolymer of excellent qualities, and have finally achieved the present invention.

SUMMARY OF THE INVENTION

The present invention provides a method of producing a highly impact-resistant and substantially colorless polyether-polyamide block copolymer by copolymerizing, in the presence of an anionic polymerization catalyst, a lactam and a polyether prepolymer which is prepared by reacting a polyoxyalkylene having two terminal hydroxy groups with an N-chlorocarbonyl lactam.

DETAILED DESCRIPTION OF THE INVENTION

The polyoxyalkylene having two terminal hydroxy groups employed in the method of the present invention is a polyether diol represented by the formula:

wherein $R^1$ is an aliphatic hydrocarbon residual group having 2 to 6 carbon atoms, and n is an integer of 4 to 450. $R^1$ is a hydrocarbon residual group having preferably 2 to 6 carbon atoms, more preferably 2 to 4 carbon atoms, and exemplary groups are:

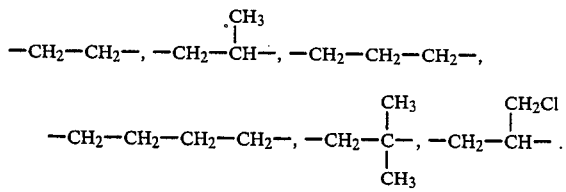

Two or more of these groups may be present in the molecule.

Particularly preferred polyoxyalkylenes are poly(oxyethylene), poly(oxypropylene), and poly(oxytetramethylene) diol.

The polyoxyalkylene having two terminal hydroxy groups can be obtained by the alkaline ring-opening or cationic ring-opening polymerization of a cyclic ether using a diol or other catalyst as a starting material.

Exemplary cyclic ethers are ethylene oxide, propylene oxide, isobutylene oxide, oxetane, tetrahydrofuran, and epichlorohydrin.

The polyoxyalkylene employed in the present invention preferably has a number average molecular weight of 300 to 20,000, more preferably 500 to 10,000. When the number average molecular weight is less than 300, sufficient mechanical properties, particularly high impact strength, are not obtained in the finally resulting polyether-polyamide block copolymer. On the other hand, when the number average molecular weight exceeds 20,000, the concentration of the terminal hydroxy groups of in the polyoxyalkylene is so low that the anionic block polymerization fails to go to completion.

The N-chlorocarbonyl lactam used in the present invention is represented by the formula:

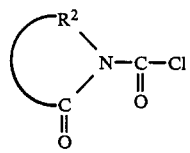

wherein R² is an aliphatic hydrocarbon residual group having 3 to 12 carbon atoms.

Preferred examples are N-chlorocarbonyl caprolactam and N-chlorocarbonyl pyrrolidinone.

The N-chlorocarbonyl lactam is usually prepared by reacting a lactim ether and phosgene in the presence of a tertiary amine, followed by treatment with hydrogen chloride gas (see *Die Makromolekulare Chemie*, 127, 34–53 (1969)).

The prepolymer of the present invention is mainly a polyether prepolymer represented by the formula:

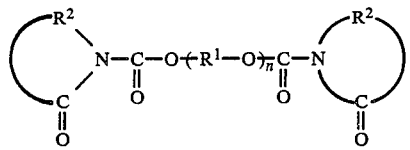

wherein $R^1$ is an aliphatic hydrocarbon residual group having 2 to 6 carbon atoms, $R^2$ is an aliphatic hydrocarbon residual group having 3 to 12 carbon atoms, and n is an integer of 4 to 450.

Said polyether prepolymer can be manufactured by reacting a polyoxyalkylene having two terminal hydroxy groups with an N-chlorocarbonyl lactam.

The reaction for obtaining the polyether prepolymer according to the present invention, i.e., the reaction of a polyoxyalkylene having two terminal hydroxy groups with an N-chlorocarbonyl lactam, takes place by the following scheme:

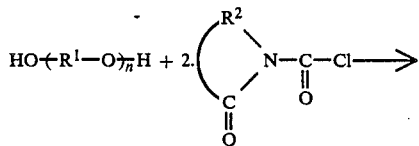

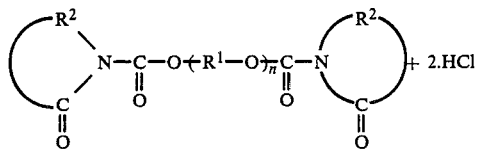

The amount of the N-chlorocarbonyl lactam used in this reaction is preferably 0.6 to 1.5 equivalents, particularly preferably 0.8 to 1.3 equivalents, to the hydroxy group in the polyoxyalkylene. If the N-chlorocarbonyl lactam is less than 0.6 equivalent to the hydroxy group in the polyoxyalkylene, the yield of the intended polyether prepolymer becomes undesirably low, and if the amount of the N-chlorocarbonyl lactam is greater than 1.5 equivalents, an undesirably large quantity of the N-chlorocarbonyl lactam remains unreacted in the reaction system.

If the amount of the N-chlorocarbonyl lactam is less than one equivalent to the hydroxy group in the polyoxyalkylene, a secondary reaction, in addition to the reaction shown above, will taken place as shown below.

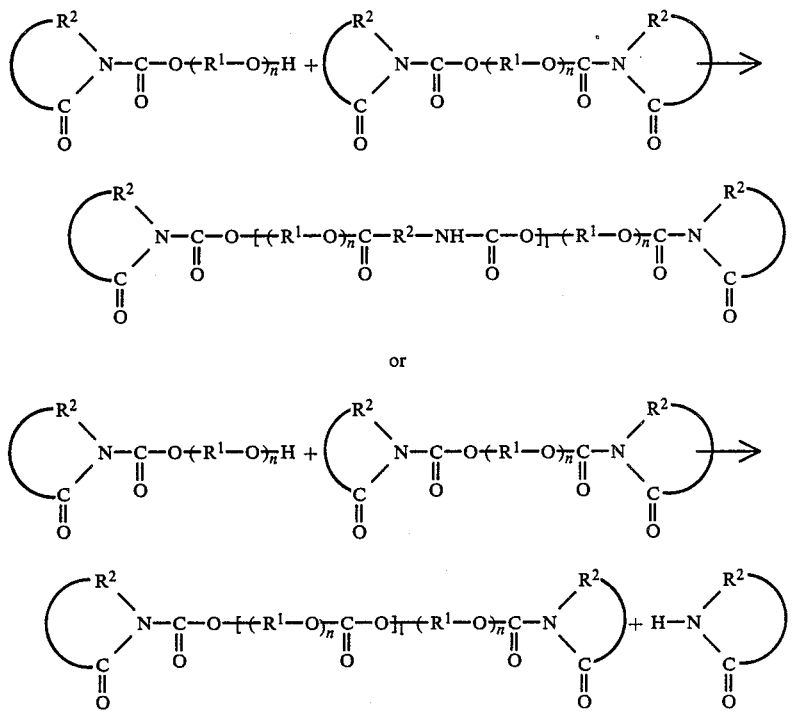

as well as an addition reaction of

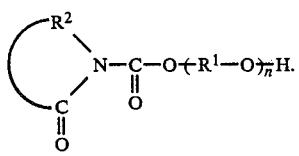

In the above reaction schemes, n is an integer of 4 to 450, and l is an integer of 1 or more.

The prepolymers produced by these secondary reactions can also be used to manufacture a polyether-polyamide block copolymer by anionic block copolymerization with a lactam.

The reaction of the polyoxyalkylene having two terminal hydroxy groups with the N-chlorocarbonyl lactam is generally carried out at 0° to 200° C., preferably at 10° to 160° C., and more preferably at 10° to 120° C.

At temperatures lower than 0° C., the reaction proceeds at an extremely slow rate, and at temperatures higher than 200° C., an undesirable decomposition reaction takes place.

The reaction for obtaining the polyether prepolymer shown above can be conducted in the presence or absence of a solvent or a dehydrochlorinating agent. Exemplary solvents used in this reaction are methylene chloride, chloroform, carbon tetrachloride, tetrahydrofuran, dioxane, acetone, methyl ethyl ketone, cyclohexanone, dimethyl sulfoxide, dimethyl cellosolve, diglyme, benzene, toluene, xylene, and carbon disulfide. Exemplary dehydrochlorinating agents are tertiary amines such as triethylamine, pyridine, dimethylaniline and diethylaniline. However, it is the least expensive to conduct this reaction in the absence of both the solvent and dehydrochlorinating agent.

In a molten state, the polyether prepolymer thus obtained is often a liquid having substantially the same viscosity as the polyoxyalkylene, which is used as one of the starting materials.

The polyether prepolymer according to the present invention is mixed with a lactam and an anionic polymerization catalyst, and subjected to the anionic block polymerization process. Materials having an active functional group other than the polyether prepolymer can also be used in this process. For example, compounds which are known as activators for anionic copolymerization of lactams, such as acyl lactam compounds, isocyanate compounds, acid halide compounds, and N-(alkoxycarbonyl)lactam compounds can be used to obtain molded products having various physical properties.

A specific method of copolymerizing the thus synthesized polyether prepolymer and the lactam is as follows:

The polyether prepolymer, lactam and anionic polymerization catalyst are mixed at the lowest possible temperature which is not lower than the melting point of the lactam. At temperatures lower than the melting point of the lactam, sufficient mixing cannot be ensured; on the other hand, excessively high temperatures are undesirable because polymerization reaction takes place during the mixing. The polymerization reaction is carried out either at an elevated temperature or by pouring the mixture into a heated container or mold. The polymerization temperature differs depending upon the kind of the lactam used, but is usually within the range of about 50° to 200° C. For example, when ε-caprolactam is used as the lactam, the temperature for mixing the polyether prepolymer, ε-caprolactam and anionic polymerization catalyst is preferably 68° to 100° C., and the polymerization temperature is preferably 100° to 200° C. At temperatures lower than 100° C., polymerization is not easily carried out, and at temperatures higher than 200° C., the obtained block copolymer assumes an undesirably distinct color.

This polymerization reaction is completed very quickly within about one hour.

In the block copolymerization according to the present invention, the amount of the polyether prepolymer is 2 to 90 wt%, preferably 10 to 80 wt%, based on the total amount of the polyether prepolymer, lactam and anionic polymerization catalyst. When the amount of the polyether prepolymer is less than 2 wt%, the obtained polyether-polyamide block copolymer does not have sufficient impact resistance, and when the amount of the prepolymer exceeds 90 wt%, the strength of the copolymer decreases to an undesirably low level.

The lactam used in the present invention is a lactam having 5 to 13 ring members such as pyrrolidinone, caprolactam, capryl lactam, enantholactam and laurolactam, among which caprolactam is the most preferred.

The amount of the lactam is 5 to 97%, preferably 15 to 89.7 wt%, based on the total amount of the polyether prepolymer, lactam and anionic polymerization catalyst.

The anionic polymerization catalyst employed in the method of the present invention can be any of catalysts that are generally used for anionic polymerization of lactams. They include all elemental alkali metals or alkaline earth metals; or hydrides, halohydrides, alkoxides, oxides, hydroxides, amides and carbonates thereof; and alkyl metals, alkyl metal halides, lactam metals, and lactam metal halides. Exemplary compounds are sodium hydroxide, potassium hydroxide, lithium oxide, ethylmagnesium bromide, phenylmagnesium bromide, calcium fluorohydride, strontium carbonate, barium hydroxide, methylsodium, butyllithium, phenylpotassium, diphenylbarium, sodium amide, diethylmagnesium, magnesium methoxide, caprolactam magnesium bromide, caprolactam sodium, and caprolactam magnesium iodide. The amount of the anionic polymerization catalyst is 0.1 to 10 wt%, preferably 0.3 to 6 wt%, based on the total amount of the polyether prepolymer, lactam and anionic polymerization catalyst. When the catalyst is less than 0.1 wt%, the anionic block copolymerization fails to go to completion, and when the catalyst exceeds 10 wt%, the obtained polyether-polyamide block copolymer has an undesirably low strength.

The polyether-polyamide block copolymer synthesized using the polyether prepolymer according to the present invention has, as already mentioned, high impact-resistance and heat-resistant properties, and a block copolymer produced with a larger amount of the polyether prepolymer can also be used as an elastomer. Thus, the block copolymer according to the present invention is applicable to many end uses, e.g., fibers, foams, automotive parts and electrical components. The copolymer can be made into the usual forms for molding resins (e.g., pellets), and subsequently molded into various shapes by injection molding, extrusion molding or other molding methods. It can also be formed into large-sized products, such as furnitures and automotive parts, by polymerizing the starting materials directly in a mold. The copolymer can also be put to various uses after modification by pigments, dyes, fibers, flame retardants, fillers, plasticizers, stabilizers or other additives.

The present invention is now described in detail by reference to the following examples, which should not be interpreted to limit the scope of the present invention in any manner.

The measurement of physical properties in the Examples and Comparative Examples was made in accordance with ASTM D2240 (Shore hardness), JIS K7110 (Izod impact strength) and JIS K-7203 (flexural modulus). The degree of color staining (yellow index) was measured in accordance with JIS K7103. Further, GPC (gas permeation chromatograph) analysis was made with an apparatus of WATERS CO., using an RI detector. The column assembly was composed of Microstyragel columns (10⁴, 10³, 500 and 10² Å) connected in series, and the measurement was made at a flow rate of 2 ml/min using THF (tetrahydrofuran) as a carrier.

EXAMPLE 1

Synthesis of polyether prepolymer using poly(oxypropylene) diol

After a 1-liter round flask equipped with a stirrer was purged with nitrogen. 500 g of poly(oxyproylene) diol (Wako Pure Chemical Industries, Ltd., number average molecular weight: 2,000) and 55 g of triethylamine were charged into the flask, and under stirring at 30° C., 97 g of N-chlorocarbonyl caprolactam was added, and the reaction was effected for 5 hours.

The resulting emulsified reaction mixture was mixed and washed with 2 liters of an aqueous sodium bicarbonate solution (2 wt%), followed by separation of the oil layer.

One liter of methylene chloride was added to the oil layer and dissolved. The aqueous layer was separated off the solution, and anhydrous sodium sulfate was added to the residue for dehydration.

The methylene chloride was distilled off with an evaporator, and the obtained viscous liquid was filtered. The resulting product was vacuum-dried at 80° C. for 24 hours to obtain 540 g of a polyether prepolymer.

The obtained polyether prepolymer was analyzed with a 90 MHz proton nuclear magnetic resonance apparatus (Hitachi, Ltd., Model R-40) in deutero chloroform with tetramethylsulane as the reference material, and the following protons were observed:

H(c) proton of the methyl group of poly(oxypropylene) at δ1.1-1.2 ppm, H(j) proton of the oxyproylene unit adjacent to the terminal oxycarbonyl caprolactam group at δ1.27-1.34 ppm, H(e, f, g) protons of the terminal oxycarbonyl caprolactam group at δ1.74 ppm, H(h) proton of the terminal oxycarbonyl caprolactam group at δ2.6-2.75 ppm, H(a, b) protons of poly(oxypropylene) at δ3.3-3.7 ppm, H(d) proton of the terminal oxycarbonyl caprolactam group at δ3.76-3.9 ppm, and H(i) proton bonded to a tertiary carbon adjacent to the terminal oxycarbonyl lactam group at δ4.9-5.2 ppm.

H(d, e, f, g, h, i, j) protons were in substantial agreement with the corresponding peaks of the nuclear magnetic resonance spectrum of N-(isopropoxycarbonyl) caprolactam. H(a, b, c, d, e, f, g, h, i, j) protons are indicated in the following formula:

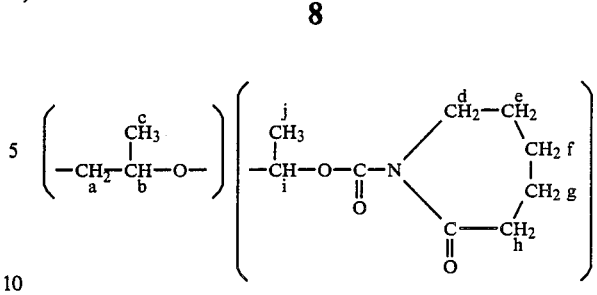

The number of the terminal oxycarbonyl caprolactams in this polyether prepolymer as calculated from the integration of this nuclear magnetic resonance spectrum was 2.0 per molecule (theoretical value: 2.0 per molecule).

The molecular weight distribution of the polyether prepolymer was determined by GPC. As a result, a chromatogram showing a single-peaked molecular weight distribution which was substantially the same as that of the starting poly(oxypropylene) diol was obtained.

Anionic block copolymerization

Experiments Nos. 1-1 through 1-3 in Table 1 show the results of the anionic block copolymerization of the polyether prepolymer prepared above and ε-caprolactam. The anionic block copolymerization was conducted in the following manner:

Caprolactam magnesium bromide (2.0 g) and ε-caprolactam (for its amount, see Table 1) were mixed and dissolved at 80° C. The resulting mixture was further blended with the polyether prepolymer (for its amount, see Table 1) at 80° C., and the obtained product was poured into a mold heated to either 140° C. or 170° C. A resin sheet was obtained in each experiment after a certain time (for specific setting times, see Table 1). Various properties of the resin sheet are indicated in Table 1.

TABLE 1

| Experiment No. | Amount of ε-Caprolactam Charged (g) | Amount of Polyether Prepolymer Charged (g) | Mold Temperature (°C.) | Setting Time (sec) | Physical Properties (23° C., 50% RH) | | | |
|---|---|---|---|---|---|---|---|---|
| | | | | | Shore Hardness | Notched Izod Impact Strength (kg · cm/cm) | Flexural Modulus (kg/cm²) | Yellow Index |
| 1-1 | 75.2 | 22.8 | 170 | 220 | 70 | 31 | 9,800 | 0.5 |
| 1-2 | 63.8 | 34.2 | 140 | 110 | 60 | 63 | 3,600 | 1.1 |
| 1-3 | 52.4 | 45.6 | 140 | 90 | 43 | did not break | 2,300 | 1.2 |

EXAMPLE 2

Synthesis of polyether prepolymer using poly(oxytetramethylene) diol

After a 1-liter round flask equipped with a stirrer was purged with nitrogen, 500 g of poly(oxytetramethylene) diol (Sanyo Chemical Industries, Ltd., number average molecular weight: 3,000) and 37 g of triethylamine were charged into the flask, and under stirring at 70° C., 64 g of N-chlorocarbonyl caprolactam was added, and the reaction was effected for 5 hours.

The resulting reaction mixture was dissolved in one liter of methylene chloride, and mixed and washed with 2 liters of an aqueous sodium bicarbonate solution (2 wt%).

After the oil layer was separated, anhydrous sodium sulfate was added to the oil layer for dehydration.

The methylene chloride was distilled off the oil layer with an evaporator, and the resulting viscous liquid was filtered at 80° C. The obtained product was vacuum-dried at 80° C. for 24 hours to obtain 517 g of a polyether prepolymer which was waxy at room temperature.

The obtained polyether prepolymer was analyzed with a 90 MHz proton nuclear magnetic resonance apparatus (Hitachi, Ltd., Model R-40) in deutero chloroform with tetramethylsilane as the reference material. As a result, the following protons were observed:

H(b, c) protons of oxytetramethylene unit and H(g, h, i) protons of the terminal oxycarbonyl caprolactam group at δ1.5–1.8 ppm, H(j) protons of the terminal oxycarbonyl caprolactam group at δ2.6–2.75 ppm, H(a, d) protons of the oxytetramethylene unit at δ3.3–3.56 ppm, H(f) proton of the terminal oxycarbonyl caprolactam group at δ3.76–3.93 ppm, and H(e) proton bonded to a secondary carbon adjacent to the terminal oxycarbonyl caprolactam group at δ4.18–4.36 ppm.

H(e, f, g, h, i, j) protons were in substantial agreement with the corresponding peaks of the nuclear magnetic resonance spectrum of N-(ethoxycarbonyl)caprolactam. H(a, b, c, d, e, f, g, h, i, j) protons are indicated in the following formula:

This polyether prepolymer was analyzed with a 90 MHz proton nuclear magnetic resonance apparatus (Hitachi, Ltd., Model R-40) is deutero chloroform with tetramethylsilane as the reference material. As a result, the following protons were observed:

H(e, f, g) protons of the terminal oxycarbonyl caprolactam group at δ1.74 ppm, H(h) proton of the terminal oxycarbonyl caprolactam group at δ2.6–2.75 ppm, H(a, b) protons of poly(oxyethylene) at δ3.63 ppm, H(d) proton of the terminal oxycarbonyl caprolactam group as a shoulder at δ3.8–3.9 ppm, and H(c) proton bonded to a secondary carbon adjacent to the terminal oxycarbonyl caprolactam group at δ4.3–4.45 ppm.

H(c, d, e, f, g, h) protons were in substantial agreement with the corresponding peaks of the nuclear magnetic resonance spectrum of N-(ethoxycarbonyl)caprolactam. H(a, b, c, d, e, f, g, h) protons are identified in the following formula:

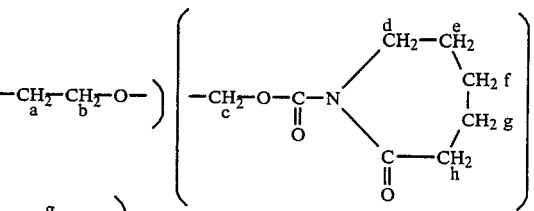

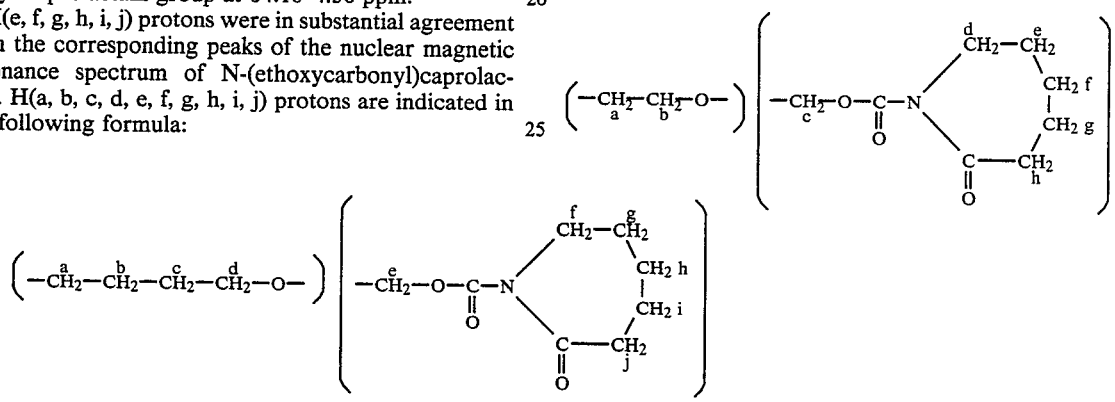

The molecular weight distribution of the polyether prepolymer was determined by GPC. As a result, a chromatogram showing a single-peaked molecular weight distribution which was substantially the same as that of the starting poly(oxytetramethylene) diol was obtained.

Anionic block copolymerization

Caprolactam magnesium iodide (1.0 g) and ε-caprolactam (32.6 g) were mixed and dissolved at 70° C. To the resultig mixture, the previously obtained polyether prepolymer (16.4 g) was further blended at 70° C., and the resulting blend was poured in a mold heated to 140° C. After a setting time of 70 seconds, a resin sheet was obtained. The resin had the following properties:
Shore hardness: 65,
Notched Izod impact strength: 91.5 kg.cm/cm,
Yellow index: 0.9.

EXAMPLE 3

Synthesis of polyether prepolymer

One hundred grams of poly(oxyethylene) diol (Wako Pure Chemical Industries, Ltd., number average molecular weight: 3,000) and N-chlorocarbonyl caprolactam (12 g) were charged in a nitrogen-purged round flask (capacity: 200 ml) equipped with a stirrer, and allowed to react for 8 hours at 80° C. The reaction was further carried out at 100° C. for an additional 5 hours while reducing the pressure with a vacuum pump connected to an alkali stripping column. A polyether prepolymer was thus obtained in a yield of 107 g.

The number of the terminal oxycarbonyl caprolactams in the polyether prepolymer as calculated from the integration of this nuclear magnetic resonance spectrum was 1.9 per molecule, which was in good agreement with the theoretical value of 2 per molecule.

Anionic block copolymerization

A mixed solution of caprolactam magnesium iodide (1.0 g) and ε-caprolactam (for its amount, see Table 2) was blended with the polyether prepolymer synthesized above (for its amount, see Table 2) at 70° C., and the resulting mixture was poured in a heated mold (for the specific temperature, see Table 2). A resin sheet was obtained in each experiment after a certain setting time (for specific setting times, see Table 2). Various properties of the resin sheet are indicated in Table 2.

EXAMPLE 4

Synthesis of polyether prepolymer using poly(oxypropylene) diol

One hundred grams poly(oxypropylene) diol (Wako Pure Chemical Industries, Ltd., number average molecular weight: 2,000) and N-chlorocarbonyl caprolactam (18 g) were charged in a nitrogen-purged 200 ml round flask equipped with a stirrer. The reaction was allowed to proceed at 70° C. for 12 hours, and for an additional 5 hours at 100° C., while reducing the pressure with a vacuum pump connected to an alkali stripping column.

A polyether prepolymer was thus obtained in a yield of 110 g.

The obtained polyether prepolymer (30 g) was washed three times with a two-phase (methylene chloride and water) solvent at a temperature lower than 10° C., and the methylene chloride layer was separated. After the methylene chloride was distilled off, the residue was vacuum-dried at 70° C. for 48 hours to obtain a sample for analysis. The sample was analyzed for the nitrogen content, which was found to be 1.2 wt% (theoretical value: 1.2 wt%).

This sample was analyzed with a 90 MHz proton nuclear magnetic resonance apparatus (Hitachi, Ltd., Model R-40) in deutero chloroform with tetramethylsilane as the reference material. As a result, the following protons were observed:

H(c) proton of the methyl group of poly(oxypropylene) at δ1.1–1.2 ppm, H(j) proton of the oxypropylene unit adjacent to the terminal oxycarbonyl caprolactam group at δ1.27–1.35 ppm, H(e, f, g) protons of the terminal oxycarbonyl caprolactam group at δ1.74 ppm, H(h) proton of the terminal oxycarbonyl caprolactam group at δ2.6–2.75 ppm, H(a, b) protons of poly(oxypropylene) at δ3.3–3.7 ppm, H(d) proton of the terminal oxycarbonyl caprolactam group at δ3.76–3.9 ppm, and H(i) proton bonded to a tertiary carbon adjacent to the terminal oxycarbonyl caprolactam at δ4.9–5.2 ppm.

H(d, e, f, g, h, i, j) protons were in substantial agreement with the corresponding peaks of the nuclear magnetic resonance spectrum of N-(isopropoxy carbonyl)-caprolactam. H(a, b, c, d, e, f, g, h, i, j) protons are identified in the following formula:

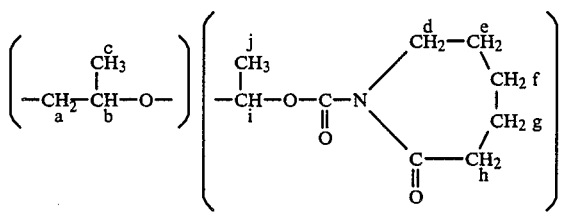

The number of the terminal oxycarbonyl caprolactams in this polyether prepolymer as calculated from the integration of this nuclear magnetic resonance spectrum was 2.0 per molecule (theoretical value: 2.0 per molecule).

The molecular weight distribution of the polyether prepolymer was determined by GPC. As a result, a chromatogram having two peaks (one large and the other small) was obtained. The larger peak indicates a molecular weight distribution which was substantially the same as that of the starting polypropylene glycol.

The smaller peak corresponded to a molecular weight about twice that of the larger peak and was presumably the peak for a dimerized prepolymer. The smaller peak was about 10% in size of the larger peak.

Anionic block copolymerization

A mixed solution of caprolactam magnesium iodide (1.0 g) and ε-caprolactam (for its amount, see Table 2) was blended with the polyether prepolymer synthesized above (for its amount, see Table 2) at 70° C., and the resulting mixture was poured in a heated mold (for the specific temperature, see Table 2). A resin sheet was obtained in each experiment after a certain time (for specific setting times, see Table 2). Various properties of the resin sheet are indicated in Table 2.

EXAMPLE 5

One hundred grams of poly(oxytetramethylene) diol (Sanyo Chemical Industries, Ltd., number average molecular weight: 3,000) and N-chlorocarbonyl caprolactam (12 g) were charged in a nitrogen-purged 200-ml round flask equipped with a stirrer. The reaction was allowed to proceed at 70° C. for 10 hours, and for an additional 5 hours at 100° C., while reducing the pressure with a vacuum pump connected to an alkali stripping column. A polyether prepolymer was thus obtained in a yield of 108 g.

The obtained polyether prepolymer (30 g) was washed three times with a two-phase (methylene chloride and water) solvent at a temperature lower than 10° C., and the methylene chloride layer was separated. After the methylene chloride was distilled off, the residue was vacuum-dried at 70° C. for 48 hours to obtain a sample for analysis. The sample was analyzed for the nitrogen content, which was found to be 0.82 wt% (theoretical value: 0.85 wt%).

This sample was analyzed with a 90 MHz proton nuclear magnetic resonance apparatus (Hitachi, Ltd., Model R-40) in deutero chloroform with tetramethylsilane as the reference material. As a result, the following protons were observed:

H(b, c) protons of the poly(oxytetramethylene) unit and H(g, h, i) protons of the terminal oxycarbonyl caprolactam group at δ1.5–1.8 ppm, H(j) proton of the terminal oxycarbonyl caprolactam group at δ2.6–2.75 ppm, H(a, d) protons of the poly(oxytetramethylene) unit at δ3.3–3.56 ppm, H(f) proton of the terminal oxycarbonyl caprolactam group at δ3.76–3.93 ppm, and H(e) proton bonded to a secondary carbon adjacent to the terminal oxycarbonyl caprolactam group at δ4.18–4.36 ppm.

H(e, f, g, h, i, j) protons were in substantial agreement with the corresponding peaks of the nuclear magnetic resonance spectrum of N-(ethoxycarbonyl)caprolactam. H(a, b, c, d, e, f, g, h, i, j) protons are identified in the following formula:

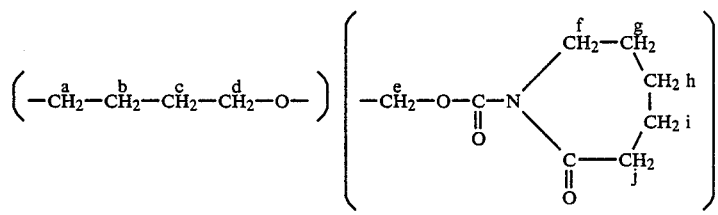

The molecular weight distribution of the polyether prepolymer was determined by GPC. As a result, a chromatogram having two peaks (one large and the other small) was obtained. The larger peak indicates a molecular weight distribution which was substantially the same as that of the starting poly(oxytetramethylene) diol. The smaller peak corresponded to a molecular weight about twice that of the larger peak and was presumably the peak for a dimerized prepolymer. The smaller peak was about 10% in size of the larger peak.

Anionic block copolymerization

A mixed solution of caprolactam magnesium iodide (1.0 g) and ε-caprolactam (for its amount, see Table 2) was blended with the polyether prepolymer synthesized above (for its amount, see Table 2) at 70° C., and the resulting mixture was poured in a heated mold (for the specific temperature, see Table 2). A resin sheet was obtained in each experiment after a certain time (for specific setting time, see Table 2). Various properties of the resin sheet are indicated in Table 2.

TABLE 2

| Example No. | Amount of ε-Caprolactam Charged (g) | Amount of Polyether Prepolymer Charged (g) | Mold Temperature (°C.) | Setting Time (sec) | Physical Properties (23° C., 50% RH) Shore Hardness | Notched Izod Impact Strength (kg·cm/cm) |
|---|---|---|---|---|---|---|
| 3 | 32.6 | 16.4 | 140 | 310 | 60 | 68.0 |
| 4 | 37.6 | 11.4 | 170 | 50 | 70 | 55.3 |
| 5 | 32.6 | 16.4 | 170 | 60 | 66 | 95.4 |

EXAMPLE 6

Synthesis of polyether prepolymer using poly(oxypropylene) diol

Five hundred grams of poly(oxypropylene) (number average molecular weight: 2,000) and N-chlorocarbonyl caprolactam (70 g) were charged in a nitrogen-purged 1-liter round flask equipped with a stirrer. The reaction was allowed to proceed at 80° C. for 7 hours, and for an additional 5 hours at 100° C., while reducing the pressure with a vacuum pump connected to an alkali stripping column. A liquid polyether prepolymer was thus obtained in a yield of 545 g.

Anionic block copolymerization

A mixed solution of phenylmagnesium bromide (1.5 g) and ε-caprolactam (33.5 g) was blended with the polyether prepolymer (15 g) synthesized above at 70° C., and the resulting mixture was poured in a mold heated to 140° C. A resin sheet was obtained after a setting time of 60 seconds. This resin sheet had an unstained white color, and had the following properties:
Shore hardness: 59,
Notched Izod impact strength: 63 kg·cm/cm,
Flexural modulus: 5,800 kg/cm².

EXAMPLE 7

A mixed solution of caprolactam magnesium bromide (1.5 g) and ε-caprolactam (41 g) was blended well with the polyether prepolymer synthesized in Example 6 (7.5 g) at 70° C., and the resulting mixture was poured in a mold heated to 150° C. A white resin sheet was obtained after a setting time of 100 seconds. The physical properties of this resin sheet are as follows:
Shore hardness: 81,
Notched Izod impact strength: 15 kg·cm/cm,
Flexural modulus: 18,000 kg/cm².

COMPARATIVE EXAMPLE 1

A mixed solution of caprolactam magnesium bromide (1.5 g) and ε-caprolactam (48 g) was blended well with the polyether prepolymer synthesized in Example 6 (0.5 g) at 70° C., and the resulting mixture was poured in a mold heated to 140° C. No polymerization was effected even after one hour.

COMPARATIVE EXAMPLE 2

A mixed solution of caprolactam magnesium bromide (1.5 g) and ε-caprolactam (2.5 g) was blended well with the polyether prepolymer synthesized in Example 6 (46 g) at 70° C., and the resulting mixture was poured in a mold heated to 140° C. The mixture became turbid, but did not set.

EXAMPLES 9 TO 10, AND COMPARATIVE EXAMPLE 3

Fifty grams of poly(oxypropylene) diol (number average molecular weight: 1,000) and N-chlorocarbonyl caprolactam (for its amount, see Table 3) were charged in a 100-ml round flask equipped with a stirrer. The reaction was allowed to proceed at 90° C. for 5 hours, and for an additional 3 hours at 110° C., while reducing the pressure with a vacuum pump connected to an alkali stripping column to obtain a polyether prepolymer. A mixed solution of caprolactam magnesium bromide (1.5 g) and ε-caprolactam (33.5 g) was blended with the polyether prepolymer (15 g) shown in Table 3 at 70° C., and the resulting mixture was poured in a mold heated to 140° C. to effect polymerization. The setting time and the characteristics of the polyether-polyamide block copolymer obtained are indicated in Table 3.

TABLE 3

| Example and Comparative Example No. | N—Chlorocarbonyl Lactam (g) | Setting Time (sec) | Appearance | Shore Hardness | Notched Izod Impact Strength (kg·cm/cm) | Flexural Modulus (kg/cm²) |
|---|---|---|---|---|---|---|
| Example 8 | 18.5 | 50 | white | 60 | 35 | 6,000 |
| Example 9 | 14 | 70 | white | 58 | 51 | 5,300 |
| Example 10 | 10.5 | 320 | white | 58 | 46 | 5,500 |
| Comparative Example 3 | 8.8 | No polymerization | — | — | — | — |

TABLE 3-continued

| Example and Comparative Example No. | N—Chlorocarbonyl Lactam (g) | Setting Time (sec) | Appearance | Shore Hardness | Notched Izod Impact Strength (kg · cm/cm) | Flexural Modulus (kg/cm²) |
|---|---|---|---|---|---|---|
| | | effected. | | | | |

EXAMPLE 11

Synthesis of polyether prepolymer using poly(oxytetramethylene) diol

Three hundred grams of poly(oxytetramethylene) diol (number average molecular weight: 3,000) and N-chlorocarbonyl caprolactam (35 g) were charged in a nitrogen-purged 500-ml round flask equipped with a stirrer. The reaction was allowed to proceed at 70° C. for 10 hours, and for an additional 5 hours at 100° C., while reducing the pressure with a vacuum pump connected to an alkali stripping column. A liquid polyether prepolymer (315 g) was obtained.

Anionic block copolymerization

A mixed solution of phenylmagnesium bromide (1.5 g) and ε-caprolactam (38.5 g) was blended with the polyether prepolymer synthesized above (10 g) at 80° C., and the resulting mixture was poured in a mold heated to 150° C. A white resin sheet was obtained after a setting time of 5 minutes. The physical properties of this resin sheet are as follows:
Shore hardness: 73,
Notched Izod impact strength: 22 kg·cm/cm,
Flexural modulus: 8,800 kg/cm².

EXAMPLE 12

Synthesis of polyether prepolymer

FIfty grams of poly(oxypropylene) diol (number average molecular weight: 3,000), N-chlorocarbonyl caprolactam (5.8 g) and dimethylaniline (4 g) were charged in a nitrogen-purged 100-ml round flask equipped with a stirrer. The reaction was allowed to proceed at 25° C. for 10 hours. The obtained dimethylaniline hydrochloride was washed off with an aqueous methylene chloride solution, and the methylene chloride layer was concentrated to obtain 49 g of a polyether prepolymer.

Anionic block copolymerization

A mixed solution of phenylmagnesium bromide (1.5 g) and ε-caprolactam (38.5 g) was blended with the polyether prepolymer synthesized above (10 g) at 80° C., and the resulting mixture was poured in a mold heated to 150° C. A white resin sheet was obtained after a setting time of 80 seconds. The physical properties of this resin sheet are as follows:
Shore hardness: 71,
Notched Izod impact strength: 24 kg·cm/cm,
Flexural modulus: 9.600 kg/cm².

EXAMPLES 13 TO 16

Fifty grams of poly(oxypropylene) diol (number average molecular weight: 2,000) and N-chlorocarbonyl caprolactam (61 g) were charged in a nitrogen-purged 100-ml round flask equipped with a stirrer. The reaction was allowed to proceed at 90° C. for 5 hours, and for an additional 3 hours at 110° C., while reducing the pressure with a vacuum pump connected to an alkali stripping column. An anionic polymerization catalyst (for its name and amount, see Table 4) was added in the flask, and the reaction was carried out for 3 hours at 70° C. to obtain a polyether prepolymer.

A mixed solution of caprolactam magnesium bromide (1 g) and ε-caprolactam (34 g) was blended with the thus obtained polyether prepolymer (15 g) at 80° C., and the resulting mixture was poured in a mold heated to 150° C. to effect polymerization. The setting time and the characteristics of the polyether-polyamide block copolymer obtained are shown in Table 4.

TABLE 4

| Example No. | Anionic Polymerization Catalyst | | Setting Time (sec) | Appearance | Shore Hardness | Notched Izod Impact Strength (kg · cm/cm) | Flexural Modulus (kg/cm²) |
|---|---|---|---|---|---|---|---|
| | Name | Amount (g) | | | | | |
| 13 | — | — | 530 | white | 57 | 42 | 5,200 |
| 14 | Caprolactam magnesium bromide | 1 | 90 | white | 58 | 73 | 5,500 |
| 15 | Caprolactam sodium | 0.5 | 100 | white | -58 | 68 | 5,400 |
| 16 | Caprolactam potassium | 0.5 | 70 | white | 59 | 67 | 5,600 |

EXAMPLE 17

A mixed solution of caprolactam magnesium bromide (1 g) and ε-caprolactam (24 g) was blended well with the polyether prepolymer synthesized in Example 6 (25 g) at 70° C., and the resulting mixture was poured in a mold heated to 140° C. A semi-transparent white resin sheet was obtained after a setting time of 70 seconds. The Shore hardness of this resin sheet was 29. Notched Izod impact strength could not be measured because the resin did not break.

While the invention has been described in detail and with reference to specific embodiments thereof, it will be apparent to one skilled in the art that various changes and modifications can be made therein without departing from the spirit and scope thereof.

What is claimed is:

1. A method for producing a polyether prepolymer of the formula:

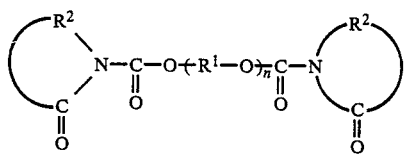

wherein $R^1$ is an aliphatic hydrocarbon residual group having 2 to 6 carbon atoms, and $R^2$ is an aliphatic hydrocarbon residual group having 3 to 12 carbon atoms, comprising reacting a poly(oxyalkylene) having two terminal hydroxy groups and having a number of average molecular weight of 1,000 to 3,000, with an N-chlorocarbonyl lactam in an amount of 0.6 to 1.5 equivalents to the hydroxy group in said poly(oxyalkylene) in the absence of any of a solvent or a dehydrochlorinating agent at a temperature of 10° to 120° C.

2. A method as claimed in claim 1, wherein said N-chlorocarbonyl lactam is N-chlorocarbonyl caprolactam.

3. A method as claimed in claim 1, wherein said poly(oxyalkylene) is at least one selected from poly(oxyethylene), poly(oxypropylene), and poly(oxytetramethylene).

* * * * *